(12) United States Patent
Stoitsev

(10) Patent No.: US 8,412,716 B2
(45) Date of Patent: Apr. 2, 2013

(54) SYSTEM AND METHOD OF PRESENTING RELEVANT APPLICATION COMPONENTS TO A USER

(75) Inventor: Todor Stoitsev, Darmstadt (DE)

(73) Assignee: SAP AG, Walldorf (DE)

( * ) Notice: Subject to any disclaimer, the term of this patent is extended or adjusted under 35 U.S.C. 154(b) by 186 days.

(21) Appl. No.: 12/961,188

(22) Filed: Dec. 6, 2010

(65) Prior Publication Data

US 2012/0143879 A1    Jun. 7, 2012

(51) Int. Cl.
*G06F 17/30* (2006.01)
*G06F 3/00* (2006.01)

(52) U.S. Cl. .......................... 707/748; 715/708

(58) Field of Classification Search .................. 707/749, 707/750, 748; 715/705, 708
See application file for complete search history.

(56) References Cited

U.S. PATENT DOCUMENTS

| | | | | |
|---|---|---|---|---|
| 5,361,361 A * | 11/1994 | Hickman et al. | ............... | 715/705 |
| 5,550,967 A * | 8/1996 | Brewer et al. | ............... | 715/709 |
| 5,694,559 A * | 12/1997 | Hobson et al. | ............... | 715/705 |
| 6,297,822 B1 * | 10/2001 | Feldman | .................. | 715/705 |
| 7,113,943 B2 * | 9/2006 | Bradford et al. | ............... | 707/739 |
| 7,343,307 B1 * | 3/2008 | Childress | ........................ | 705/4 |
| 7,346,846 B2 * | 3/2008 | Rossi et al. | .................. | 715/705 |
| 7,925,975 B2 * | 4/2011 | Bala et al. | ..................... | 715/705 |
| 8,001,470 B1 * | 8/2011 | Chen et al. | ..................... | 715/714 |
| 2002/0103789 A1 * | 8/2002 | Turnbull et al. | ................. | 707/3 |
| 2003/0016238 A1 * | 1/2003 | Sullivan et al. | ............... | 345/705 |
| 2003/0063113 A1 * | 4/2003 | Andrae | ......................... | 345/700 |
| 2004/0044635 A1 * | 3/2004 | Gordon et al. | .................. | 706/50 |
| 2005/0267795 A1 * | 12/2005 | Tian et al. | ........................ | 705/10 |
| 2007/0277104 A1 * | 11/2007 | Hennum et al. | ............... | 715/705 |

OTHER PUBLICATIONS

U.S. Appl. No. 12/817,764, filed Jun. 17, 2010.
Robert Lokaiczyk and Manuel Goertz, "Extending Low Level Context Events by Data Aggregation," Proceedings of I-KNOW '08 and I-MEDIA '08, Graz, Austria, Sep. 3-5, 2008.
Benedikt Schmidt, Todor Stoitsev, and Max Mühlhäuser, "Activity-Centric Support for Weakly-structured Business Processes," EICS '10, Jun. 19-23, 2010, Berlin, Germany.
Robert Lokaiczyk, Verfahren kontextbasierter Nutzerzielanalyse. Dissertation. 2009.
Heiko Paulheim and Florian Probst, "Ontology-Enhanced User Interfaces: A Survey," Int. J. Semantic Web Inf. Syst. 6(2): 36-59 (2010).

* cited by examiner

*Primary Examiner* — Jorge A Casanova
(74) *Attorney, Agent, or Firm* — Fountainhead Law Group PC

(57) ABSTRACT

In one embodiment the present invention includes a computer implemented method of presenting relevant application components to a user of a computer system. The method includes capturing text displayed in open applications, determining key terms in the captured text based on a key terms catalog, and determining potentially relevant components by using the key terms to search a user interface dictionary. The user interface dictionary corresponds to a map between user interface strings and user interface components. The method further includes computing relevance scores for potentially relevant components, and presenting to the user the relevant components that correspond to relevant ones of the potentially relevant components, according to the relevance scores.

18 Claims, 4 Drawing Sheets

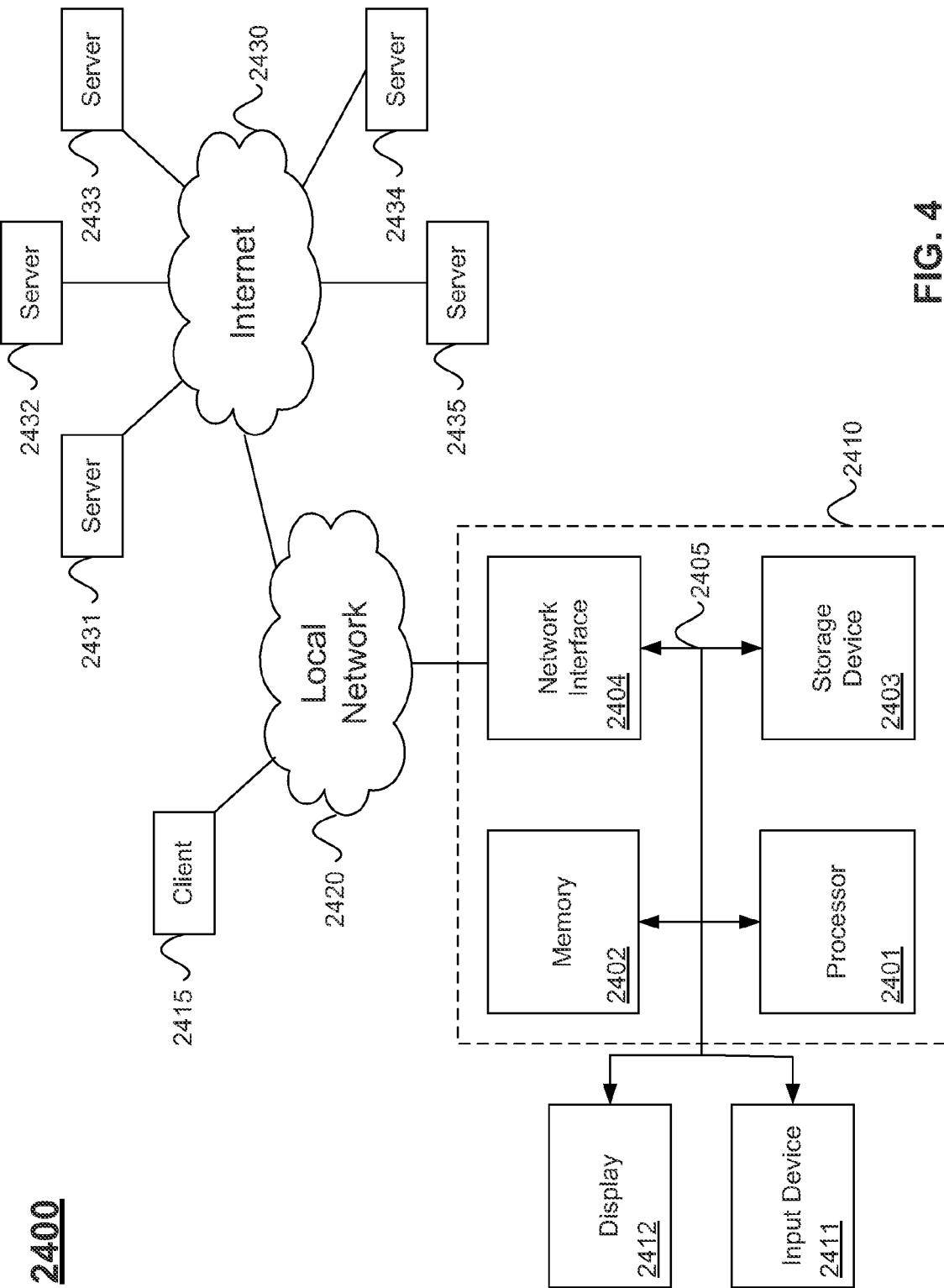

SYSTEM AND METHOD OF PRESENTING RELEVANT APPLICATION COMPONENTS TO A USER

CROSS REFERENCE TO RELATED APPLICATIONS

Not applicable.

BACKGROUND

The present invention relates to user interface improvement, and in particular, to improving the efficiency of a user by presenting relevant application components.

Unless otherwise indicated herein, the approaches described in this section are not prior art to the claims in this application and are not admitted to be prior art by inclusion in this section.

The business user nowadays is facing various knowledge intensive tasks, which are performed in a heterogeneous application environment. On the one hand, this environment comprises common office applications (e.g., email, text processing software, presentation software, etc.) that are used for generic communication and authoring tasks. On the other hand, a crucial part of the working environment is formed by business applications (e.g., customer relationship management, enterprise resource planning, supply chain management, etc.) that are used for specific business tasks. A large amount of information is exchanged through the first type of applications resulting in actions in the second type of applications—e.g. emails are sent with important documents and trigger a task for generating a report, etc.

SUMMARY

Given the above background, it has been observed that the following problems arise. First, users cannot (or can only hardly find) the right functionality for performing the necessary business tasks in the business applications. Second, some functionality of the business applications is never used, because the users do not know that it exists and they perform the corresponding operations manually with increased effort.

It is theorized that the reason for these problems is the complexity and specificity of business applications, and most importantly the lack of connection between the unstructured information (from email, documents, presentations) to the formal functionalities in the business applications. Herewith a method is proposed, which can be applied to any software application, to enable straightforward access from generic desktop applications and information sources to relevant information resources and user interface components of the business applications.

Embodiments of the present invention improve the efficiency of users in a user interface environment. Embodiments of the present invention are directed toward proactive user assistance in the context of knowledge intensive work. Particularly, the focus is set on the transition between unstructured work (e.g., in common office applications such as email and text processing applications) on the one hand, and structured work (e.g., in business applications, where various business transactions and processes can be triggered and managed) on the other hand.

The method according to an embodiment is based on the observation that each functionality in a business application, which is accessed directly by a business user, manifests in some user interface (UI). The method according to an embodiment uses the UI to assess the relevance and applicability of a given application (or application component) for a given user context, and to suggest this application (or application component) to the business user for performing their task. In the following the term "user context" refers to all opened user working applications, documents etc. on the desktop level. The phrase "application component" (or simply "UI component") is used in the following, whereas this term can denote also a complete application (e.g., when it refers to the top-level component in that application).

The user working context may be captured through so called context sensors in terms of visible text on desktop level. Then the text is searched for strings, which occur as titles or labels in functional areas of the business applications. Depending on the key words found, relevant components of the business application are determined. A relevance score is computed for these components and used to order them in a suggestion list. The user can then access these components directly in a shortcut-like manner to perform their business task.

In one embodiment the present invention includes a computer implemented method of presenting relevant application components to a user of a computer system. The method includes capturing text displayed in open applications, determining key terms in the captured text based on a key terms catalog, and determining potentially relevant components by using the key terms to search a user interface dictionary. The user interface dictionary corresponds to a map between user interface strings and user interface components. The method further includes computing relevance scores for potentially relevant components, and presenting to the user the relevant components that correspond to relevant ones of the potentially relevant components, according to the relevance scores.

The method may also include creating the user interface dictionary, and creating the key terms catalog based on the user interface dictionary. The user interface dictionary may be created at design time, at runtime, or manually.

The text may be captured by monitoring application events, mouse events and keyboard events.

According to an embodiment, a computer program, embodied on a non-transitory recording medium, controls a computer system to present relevant application components to a user of the computer system. The computer program includes a capturing component, a first determining component, a second determining component, a computing component, and a presenting component. The capturing component is configured to control the computer system to capture a text displayed in open applications. The first determining component is configured to control the computer system to determine key terms in the captured text based on a key terms catalog. The second determining component is configured to control the computer system to determine potentially relevant components by using the key terms to search a user interface dictionary. The user interface dictionary corresponds to a map between user interface strings and user interface components. The computing component is configured to control the computer system to compute relevance scores for the potentially relevant components. The presenting component is configured to control the computer system to present to the user the relevant components, where the relevant components correspond to relevant ones of the potentially relevant components according to the relevance scores.

According to an embodiment, a computer system presents relevant application components to a user of the computer system. The computer system includes a client computer and an application server computer. The application server computer is coupled to the client computer via a network. The application server is configured to capture text displayed in open applications, to determine key terms in the captured text based on a key terms catalog, to determine potentially relevant components by using the key terms to search a user interface dictionary, and to compute relevance scores for the potentially relevant components. The client computer is configured to present to the user the relevant components, which are those that correspond to relevant ones of the potentially relevant components according to the relevance scores.

Embodiments of the present invention may be used to enhance any application with UI, for direct, shortcut-like access to relevant functionalities for the current user working task. For example, receiving an email with texts Sales Report, Q1, 2010 would result in a direct link to an application component for creating reports in an enterprise system in a sidebar component. As a result, the user can directly find and navigate to the required enterprise system screen from a contextual side bar.

The following detailed description and accompanying drawings provide a better understanding of the nature and advantages of the present invention.

BRIEF DESCRIPTION OF THE DRAWINGS

FIG. 4 is a block diagram of an example computer system and network for implementing embodiments of the present invention.

DETAILED DESCRIPTION

Described herein are techniques for presenting relevant application components to a user. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In this document, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive- or is intended, such will be specifically noted (e.g., "either A or B", "at most one of A and B").

Figure 1:
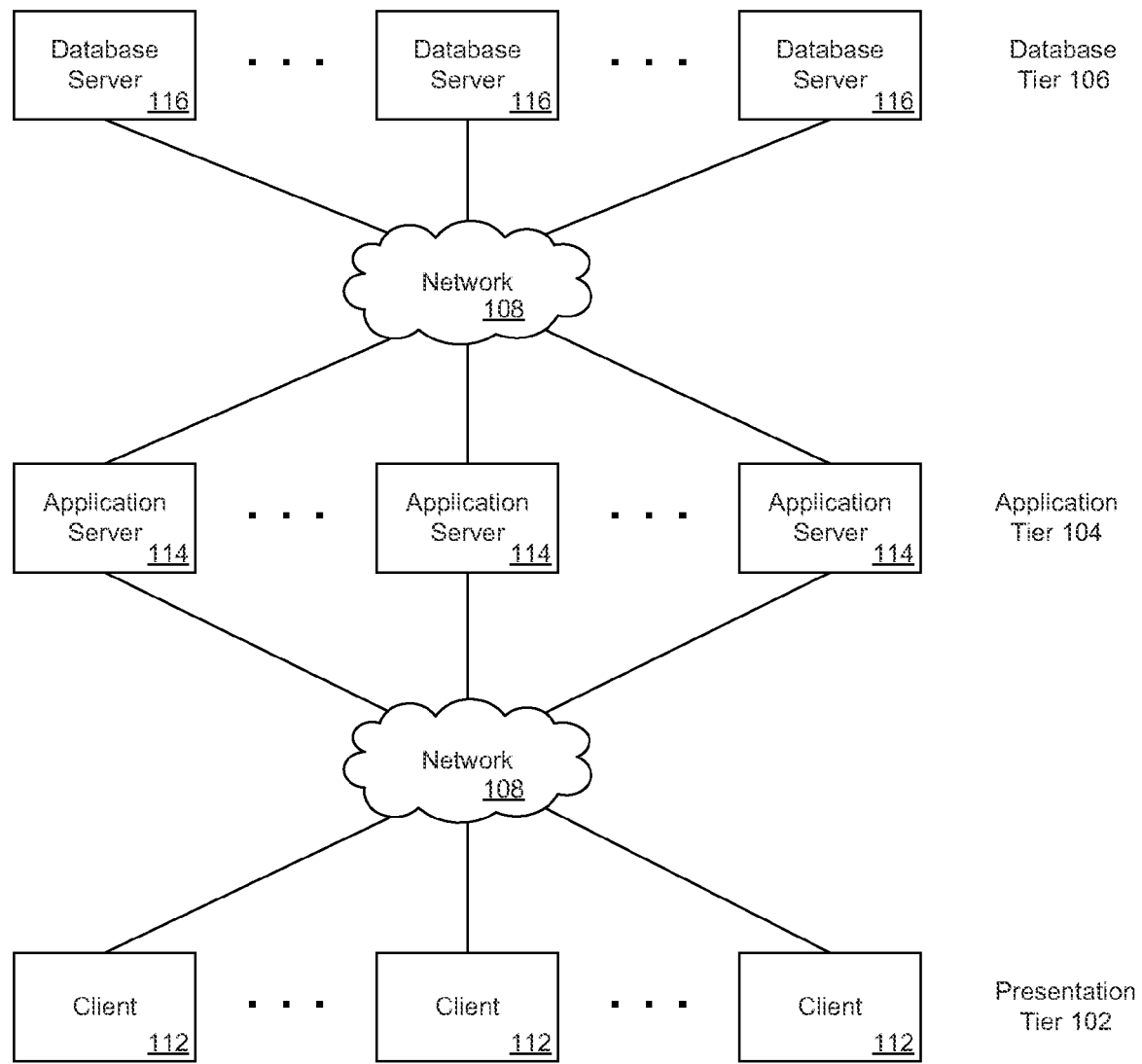
FIG. 1 is a block diagram of a three tier architecture system that may be used to implement an embodiment of the present invention.

FIG. 1 is a block diagram of a three tier architecture system 100 that may be used to implement an embodiment of the present invention. The system 100 includes a presentation tier 102, an application tier 104, and a database tier 106. A network 108 connects the devices within and between the tiers. The network 108 may include one or more networks, such as a local area network, a wide area network, or the internet.

The presentation tier 102 generally includes one or more client computers 112. The client computers 112 generally provide a graphical user interface for users to interact with the other parts of the system 100. The user interface may be implemented by a browser, for example as a Java application.

The application tier 104 generally includes one or more application servers 114. The application servers 114 generally implement the business logic for processing interactions between the users and the underlying data. This business logic is generally referred to as "the application" or "the application program". The application tier may implement various applications to perform various functions, such as invoicing, inventory control, supply chain management, etc. Various of the application servers 114 may perform different functions. For example, one of the application servers 114 may be used for prototyping or development, while the others may be used for business intelligence production activities.

The database tier 106 generally includes one or more database servers 116. The database servers 116 generally implement a database management system that stores and manipulates the underlying data and related metadata. This database management system is generally referred to as "the database" or "the database system" or "the database program". The database servers 116 may implement various types of database systems, including DB2, Informix, MaxDB, Oracle and Microsoft SQL Server™.

Although many separate devices are shown in each tier, such is mainly for illustration purposes to show scalability. For example, a single database server may be used in the basic configuration, but as the amount of data in the databases increases, the number of database servers 116 may be increased. As another example, a single application server may be used in the basic configuration, but as the amount of business logic processes increases, the number of application servers 114 may be increased.

The system 100 may be implemented in a variety of operating systems, for example, UNIX (AIX, HP-UX, Solaris, Linux), Microsoft Windows, IBM Series i (former iSeries, AS/400) and IBM zSeries (former S/390). The various devices in the various tiers may implement different operating systems. For example, a client computer 112 may run Microsoft Windows™ and an application server 114 may implement Linux. Note that various devices generally implement both an operating system program and another program, which are distinct. For example, a client computer 112 may implement Microsoft Windows™ (operating system) and Microsoft Internet Explorer™ (user interface program). An application server 114 may implement Linux (operating system) and an invoicing system (application program). A database server 116 may implement Linux (operating system) and Oracle database (database program).

The SAP Web Application Server™ is a specific example of an implementation of the system 100. An embodiment of the present invention generally involves an application program (at the application server 114) and a user interface program (at the client computer 112), as detailed below.

As mentioned above, an embodiment is based on the observation that each functionality in a business application, which is accessed directly by a business user, manifests in some user interface (UI). The method uses the UI to assess the relevance and applicability of a given application (or application component) for a given user context and to suggest this application (or application component) to the business user for performing their task.

In the following, the term "user context" refers to all opened user working applications, documents, etc. on the desktop level. The term "application component" (or simply "UI component") is used in the following to mean both one or more elements of an application, as well as to denote a complete application (e.g., when it refers to the top-level component in that application).

Figure 2:
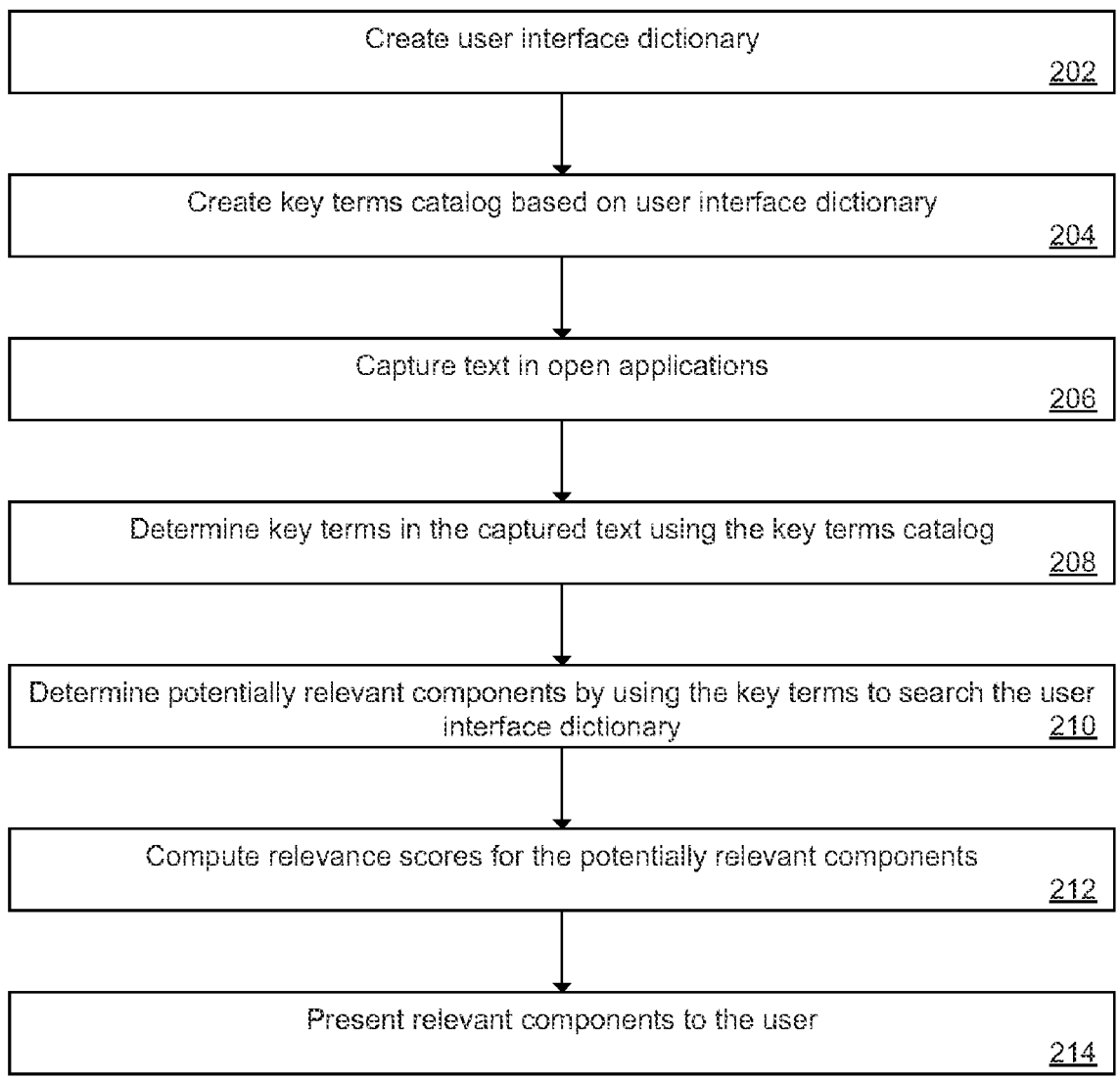
FIG. 2 is a flowchart of a method of presenting relevant application components to a user, according to an embodiment.

FIG. 2 is a flowchart of a method 200 of presenting relevant application components to a user, according to an embodiment. The method 200 may be performed by the system 100 (see FIG. 1), for example by executing one or more computer programs. More specifically, an embodiment may be implemented in the SAP Enterprise Performance Management (EPM) Shared Business Components (SBC) Business User Interface (BUI) environment. The application enables users to create workspaces, to add different views to the workspaces, and to add various visual components such as widgets, scorecards, reports, etc. to the views. Workspaces and views are accessible components, i.e. the URL visible in the browser window can be used to directly access them.

At 202, a user interface dictionary is created for application components. In general, the user interface (UI) dictionary corresponds to a map between user interface strings and user interface components. Before explaining the various possible ways to create the dictionary, first the dictionary structure is explained.

The UI dictionary can be generally described as a map that assigns visible UI strings (e.g., component titles, labels, etc.) to the respective UI components. For example, a panel with title "Address" will be stored in the dictionary as a value for the key "Address".

If a UI string contains an expression with multiple words, various configuration options can be enabled during the UI dictionary creation to achieve different levels of precision for the dictionary. For example, it can be specified whether all words of such a string should be included in the dictionary or only the expression as a whole. In the first case, a panel with title "Post code" for example will be added as a value for 3 keys "Post", "code", "Post code". In the second case for example, the panel will be added only as a value for key "Post code".

As a given text may occur in multiple UI components, the dictionary enables a one-to-many relationship from a given string to relevant components. For example, the dictionary may be implemented as a set of database tables or simply as a hash table with key—the label text, and value—a collection of relevant components:

UIDictionary(KEY)=[COMP_1, COMP_2, . . . , COMP_N]

The purpose of the presented method is to capture user working context and suggest relevant application components for performing the related business tasks. Therefore according to one embodiment, only accessible components may be stored in the UI dictionary, to keep its size moderate and to optimize performance and memory consumption. In the following description, the term "accessible" means that the components can be directly opened in the desktop environment (e.g. through an uniform resource location [URL] link). For example, in a web-based application this can be enabled through deep linking where a URL link can open the web application at a specific page showing specific components.

The UI dictionary can be constructed at design time of the applications (or application components), at runtime, or manually. These three ways are detailed in subsequent sections. A consideration for constructing the dictionary in any case is that it should be possible to trace the component hierarchy of the business application, i.e. to trace the parent/child components of a given component. This is useful for the reasoning and relevance assessment of UI components.

To support relevance assessment of UI components for a given key term, a so called relevance score can be computed during UI dictionary construction for each UI component in an application. The relevance score of a component is a parameter that helps to order the components with respect to their relevance for a given key term. The final goal of the method is to suggest the accessible component with the highest relevance score for all detected keywords altogether.

One possible way to manage a component's relevance score is to provide a mapping (e.g., hash map, etc.) in each UI component (or custom component wrapper class), assigning the key term strings as keys to an integer value RELEVANCE_SCORE. Most programming languages have well defined hierarchies for their UI classes (e.g. for java see <hxxp://www.falkhausen.de/en/diagram/html/java.awt.Components.html>). So one possible way to compute the relevance score is as follows:

a) If the component that contains a given key term is accessible, it receives 1 to their relevance score for that key term.

b) If the component is not accessible, the parent hierarchy is traversed upwards starting from that component and the first encountered accessible component receives 1 to their relevance score for that key term.

For example, if an accessible panel has two nested inaccessible panels, with titles "Task activation" and "Task delegation", and the UI dictionary has been configured to include all words of a UI string expression, the parent panel will have relevance score 2 for the key "Task". If during the context detection (see the following sections) the term "Task" is encountered, this will lead to suggesting the parent panel which comprises a broader functionality set for a given concept ("Task"). (For example, "suggesting" according to an embodiment involves displaying relevant resources in a side bar, ordered by their relevance scores.) The user can then decide which functionality precisely they want to use (activation or delegation).

On the other hand, if the panel with title "Task delegation" is accessible, it will have relevance score 1 for "Task" and 1 for "Task delegation" (in case that the UI dictionary has been configured to include all words of a UI string expression). So if the term "Task delegation" is encountered during context detection (see the following sections), the panel with title "Task delegation" will have relevance score 2 altogether, whereas the parent panel will only have relevance score 1 for "Task" from the inaccessible sub-panel with title "Task activation". As a result the panel with title "Task delegation" will be suggested with higher relevance score than the parent panel.

Relevance scores for the final suggestion may be refined additionally through the text analysis so that the relevance scores from the UI dictionary creation need not be final. This is discussed in more detail further in the document.

Design Time Construction

A design time construction of the UI dictionary may take place when the user interface is constructed in a given development environment (e.g. Eclipse). When component labels are created, a UI description document will be respectively generated/updated. This document can be in any format with the only requirement, that it should allow tracing the component hierarchy. A further aspect is that labels in all supported locales should be considered.

For example, the UI description can be an extensible markup language (XML) file in the form shown in TABLE 1, where components that have the "url" attribute are considered accessible and the others not:

TABLE 1

```
<component name="COMPONENT_NAME" url="SOME_URL">
    <label text="LABEL_TEXT_EN">
    <label text="LABEL_TEXT_DE">
    <component name="SUB_COMPONENT_NAME" >
        <label text="LABEL_TEXT">
        ...
    </component>
    ...
</component>
```

Also a resource description framework (RDF) or web ontology language (OWL) format can be chosen for the UI description if some advanced reasoning needs to be supported later on.

When the system for proactive user assistance is started, this UI description document can be parsed to create the UI Dictionary structure and compute the component relevance scores as discussed in the previous section.

Runtime Construction

Regarding a runtime construction of the UI dictionary, note that most programming languages have well defined hierarchies of their UI classes (e.g. for java see <hxxp://www-.falkhausen.de/en/diagram/html/java.awt.Components.html>). This allows accessing the component hierarchy of an application at runtime (e.g., when the application is initialized), going through all components that contain visible text (e.g., labels, buttons, titles, etc.) and generating the UI dictionary of an application dynamically by considering the texts in all available locales. In applications with many UI components a low priority background thread may be started to perform this dictionary creation in order to optimize system performance.

Manual Construction

Regarding manual construction of the UI dictionary, note that this may be the most simple but also laborious way to construct it. This manual process can be performed by browsing through an application and manually or semi automatically, creating a UI description document for the various application components. This way of UI Dictionary creation is suitable for implementing small proof-of-concept scenarios without intervention in the application development environment (as with design time construction) or in the application as such (as with runtime construction). A manual construction can be performed e.g. by modeling the UI in an ontology (RDF or OWL format) by using tools like Protégé (<hxxp://protege.stanford.edu/>) or by simply typing a XML UI description file (see, e.g., TABLE 1).

According to an embodiment, the UI dictionary may be created manually as an OWL ontology using the Protégé tool <hxxp://protege.stanford.edu/>. When the application for proactive user assistance (Java based) is started, the ontology may be parsed through Jena functionality (see <hxxp://jena-.sourceforge.net/>) to generate the UI dictionary as a hash table with keys—UI component titles (class labels from the ontology above), and values—an ArrayList of accessible components. For the values, a custom component class is used, which contains hash tables with keys—the UI strings, and values—relevance scores (see above). The custom component class may also have the accessible URL as member parameter.

At 204, the key terms catalog is created based on the user interface dictionary. The computer system 100 may create the key terms catalog by performing text analysis, as further detailed below.

In order to enable the transition from unstructured to structured application resources, various text analysis techniques may be used. Concretely, the method includes looking for UI strings of UI components, which are defined as keys in the UI dictionary, in the visible text of the active applications on user desktop level. These UI strings may be defined as key terms in a key terms catalog. The key terms catalog can be derived directly from the UI dictionary (see 202), it can be created based on a UI description document (see TABLE 1), or it can be created manually.

The format of the key terms catalogue depends on the selected text analysis application. For example, the SAP BusinessObjects™ Text Analysis framework (<hxxp://www.sap.com/solutions/sapbusinessobjects/large/eim/textanalysis/index.epx>) enables the creation of name catalogues with key terms, which are exported in XML format (see TABLE 2) and can be compiled to proprietary name catalog files.

TABLE 2

```
<?xml version="1.0" encoding="UTF-8" ?>
<catalog name="Context">
    <entity_category name="Context">
        <entity_name canonical="EMEA"/>
        <entity_name canonical="SAP Research"/>
        <entity_name canonical="SAP Research Management">
            <variant name="SAP Research Management Team"/>
            <variant name="SAP Research Mgmt."/>
        </entity_name>
        <entity_name canonical="Travel"/>
        <entity_name canonical="Travel Management"/>
    </entity_category>
</catalog>
```

According to an embodiment, the key terms catalog may be created in the SAP BusinessObjects™ Text Analysis framework and more specifically in the ThingFinder™ Name Catalog Workbench. The name catalog may contain all UI strings that occur as titles, labels, etc. in the workspace components. The name catalog may be created manually. The name catalog is compiled and the compiled file may be provided for use by the application for proactive user assistance through the ThingFinder™ Java™ application programming interface (API).

At 206, the text displayed in the applications open to the user is captured. For example, the computer system 100 may capture the text by monitoring application events, mouse events and keyboard events.

More specifically, for capturing the visible text in the opened user applications, a set of context sensors can be used. The context sensors may be installed and running as standalone applications. The context sensors listen for application, mouse, keyboard and other events on the operating system level. According to an embodiment, the system described in the following patent application may be used: U.S. application Ser. No. 12/817,764 for "Activity Schemes for Support of Knowledge-Intensive Tasks" filed Jun. 17, 2010, which is commonly owned by the assignee of the present application. This system enables for example: capturing text, email fields, attachment titles etc. from a currently selected email in MS Outlook; capturing visible text in MS Word, PDF documents and web browsers just to name few. According to other embodiments, the context sensors described in the following documents may be used: Robert Lokaiczyk, "Verfahren kontextbasierter Nutzerzielanalyse", Dissertation (University of Leipzig, 2009); Robert Lokaiczyk and Manuel Goertz, "Extending Low Level Context Events by Data Aggregation", in Proceedings of I-KNOW '08 and I-MEDIA '08, at 118-125 (2008); and Benedikt Schmidt, Todor Stoitsev and Max Mühlhäuser, "Activity-Centric Support for Weakly-Structured Business Processes", in Proceedings of the 2nd ACM SIGCHI Symposium on Engineering Interactive Computing Systems, at 251-260 (ACM, New York 2010).

According to an embodiment, a set of context sensors from the Aposdle framework is used for capturing the visible text in the opened user applications. This functionality runs as an .exe on the local (client) computer and listens for application, mouse, keyboard and other events on the operating system level. This system enables, for example, capturing text, email fields, attachment titles, etc. from a currently selected email in Microsoft Outlook™; capturing visible text in Microsoft Word™, PDF (portable document format) documents and web browsers; etc. The system transmits the captured content over CORBA (common object request broker architecture) IIOP (internet inter-orb protocol) to the Java™ application for proactive user assistance.

At 208, key terms in the captured text are determined based on the key terms catalog. For example, the computer system 100 may determine the key terms by performing text analysis on the captured text based on the key terms catalog.

More specifically, this step may performed by calling the text analysis functionality on the extracted visible text. Depending on the text analysis software, the confidence level of the found terms, the number of occurrences, etc. can be provided in the result. In any case, the result should deliver a collection of all key terms that were found in the visible text on desktop level.

According to an embodiment, the SAP BusinessObjects Text Analysis tool may be used in this step. More specifically, the ThingFinder™ Java™ API is used to call the text analysis functionality of the SAP BusinessObjects Text Analysis™ framework on the content, transmitted through the context sensors. The developed text analysis name catalog is used for the key term search.

At 210, potentially relevant components are determined by using the key terms to search the user interface dictionary. For example, the computer system 100 may determine the potentially relevant components according to the user interface dictionary being keyed according to the plurality of key terms.

More specifically, the collection with found key terms from the text analysis may be used to get all relevant (accessible) components for these key terms from the UI dictionary. Recall that the key terms match the key in the dictionary, where the values are collections with relevant components.

According to an embodiment, the search may performed by iterating through the ThingFinder™ result set from the key terms search and getting the component ArrayLists from the UI dictionary hash table by using the found key terms as keys.

At 212, relevance scores are computed for the potentially relevant components. The computer system 100 may compute the relevance scores in a number of ways: according to the number of occurrences of the key terms for a given component in the analyzed text provided by the context sensors, according to a hierarchical user interface component structure, or according to the number of occurrences of the key terms for a given component in the analyzed text that are additionally weighted according to the hierarchical user interface component structure, etc. The ratings are generally influenced by the following: 1) how many key terms that are relevant for a given component were found in the captured text/context information; and 2) what is the number of occurrences of each of the found key terms in the analyzed text/context information.

More specifically, to optimize the suggestion of relevant components, an overall relevance score is computed for each component. The computation depends also on the capabilities of the text analysis software. The purpose is to finally determine the components that are most relevant for the current user working context and can potentially best serve the user in performing their tasks. Thereby it should be considered that a component can have a relevance score for more than one key term, a key term can have various number of occurrences in a given text, and a key term can be detected with various confidence levels (e.g., considering substrings, etc.).

One way to compute the overall relevance score for a component is as follows. The overall component relevance score may be computed as the sum of component relevance scores for all associated key terms, that is $$R_c = \sum_{i=1}^{n} r_{ci}$$

with $$r_c = r_h + \sum_{j=1}^{m} 1 + c_j$$

where
$R_c$—overall component relevance score,
$r_{ci}$—overall component relevance score for key term i with 1 to n enumerating all key terms for which a component is relevant,
$r_c$—overall component relevance score for a given key term,
$r_h$—current component relevance score for key term based on the component hierarchy (see 202 above), and
$c_j$—confidence level of key term occurrence (optional depending on text analysis software) with 1 to m enumerating all key term occurrences.

According to an embodiment, the computation of the relevance scores may be performed according to the formulas above by iterating through the obtained ArrayLists with relevant components.

At 214, relevant components are presented to the user. The relevant components correspond to relevant ones of the potentially relevant components according to the relevance scores. Furthermore, the relevant components may correspond to accessible relevant components. The accessible relevant components may be directly openable in the user interface environment or directly openable in the user interface environment according to a uniform resource location link. As an example, the application server 114 (see FIG. 1) may use the relevance scores to rank the potentially relevant components, and may send the most relevant components to the client computer 112 to display to the user. As another example, the context information may be transmitted from the client computer 112 to the application server 114 over common object request broker architecture (CORBA). As yet another example, the assistance application that analyzes the component structure and provides the side bar with the suggestions may reside locally on the client computer 112 (e.g., when the UI dictionary is created manually and is not delivered from the actual business application).

More specifically, the accessible components may be ordered according to their overall relevance score and displayed to the user. This can happen for example in a side bar or simply in a console, whereas it is preferable to enable direct access to the UI components, e.g. through links or buttons. A side bar can be implemented as a standalone application on desktop level or it can be integrated also in other applications (including office applications). Additional filtering criteria can be provided, e.g. to specify that only components with relevance score above a given threshold should be displayed.

According to an embodiment, the relevant components may be suggested by providing the URL link from the custom component instances (see 202) in the Java™ console, ordered by the relevance score. A more advanced implementation includes a side bar with link buttons.

Figure 3:
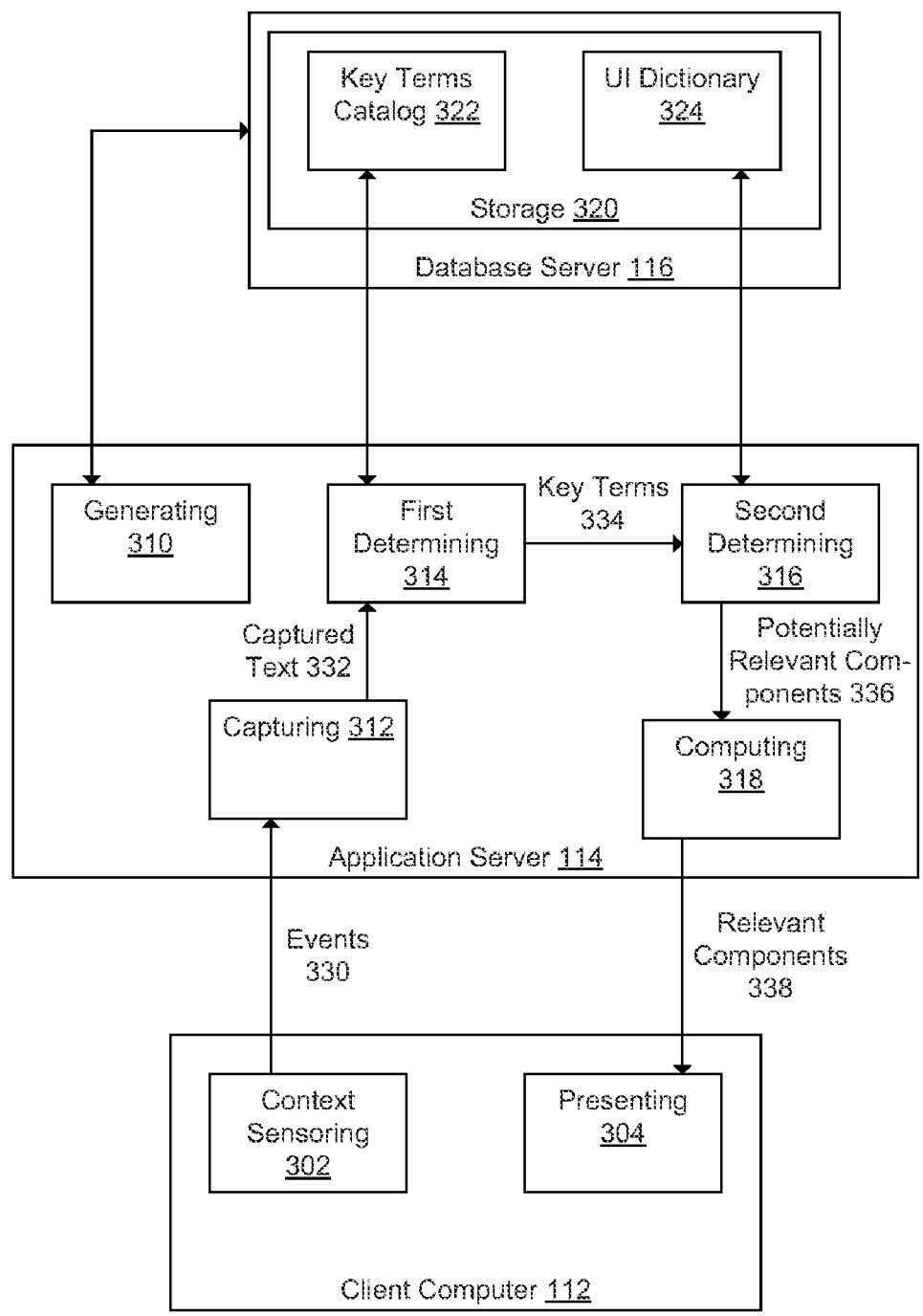
FIG. 3 is a block diagram showing a system that executes various computer program components to implement an embodiment of the present invention.

FIG. 3 is a block diagram showing a system 300 that executes various computer program components to implement an embodiment of the present invention. The system 300 includes a client computer 112, an application server 114, and a database server 116 (see also FIG. 1). These computers execute various computer program components, as follows. The client computer 112 executes a context sensing component 302 and a presenting component 304. The application server 114 executes a generating component 310, a capturing component 312, a first determining component 314, a second determining component 316, and a computing component 318. The database server 116 executes a storage component 320 that stores a key terms catalog 322 and a UI dictionary 324. (For brevity, a phrase such as "component X that performs function Y" may be read as "component X that controls related hardware, e.g., the database server 116, to perform function Y".)

In general, the system 300 implements the method 200 described above (see FIG. 2). More specifically, the generating component 310 creates the user interface dictionary 324 and creates the key terms catalog 322 based on the user interface dictionary. The context sensing component 302 senses events 330 (also referred to as the context) at the client computer 112 and outputs the events 330 to the application server 114. The capturing component 312 receives the events 330, captures the text, and outputs captured text 332. The first determining component 314 receives the captured text 332, determines key terms 334 based on the key terms catalog 322, and outputs the key terms 334. The second determining component 316 receives the key terms 334, determines potentially relevant components 336 by using the key terms 334 to search the user interface dictionary 324, and outputs the potentially relevant components 336. The computing component 318 receives the potentially relevant components 336, computes relevance scores for the plurality of potentially relevant components, and outputs relevant components 338. The presenting component 304 receives the relevant components 338 and presents the relevant components 338 to the user.

The standard configuration of the system 300 may be modified as further detailed below. One alternative configuration is that the application server 114 creates the UI dictionary during runtime, i.e. when loading application components, eventually derives a key terms catalog from the dictionary, and stores them in memory. The client computer 112 captures the context through the context sensing component 302, transmits it to the application server 114, and receives the evaluated suggestions (the relevant components 338) as output. This alternative may be implemented when the "database" per se is eliminated, for example when storage is performed in memory of the application server 114 or when the application server 114 implements an in-memory database. Another alternative configuration is when the UI dictionary 324 and the key terms catalog 322 are created manually and stored on the client computer 112, or they are created on the application server 114 and downloaded to the client computer 112. Then context capturing as well as the analysis, scoring and suggestions are all performed on the client computer 112. This alternative may be implemented in environments where the client computer 112 does not expect continuous contact with the application server 114, for example in an offline operation mode.

FIG. 4 is a block diagram of an example computer system and network 2400 for implementing embodiments of the present invention. Computer system 2410 includes a bus 2405 or other communication mechanism for communicating information, and a processor 2401 coupled with bus 2405 for processing information. Computer system 2410 also includes a memory 2402 coupled to bus 2405 for storing information and instructions to be executed by processor 2401, including information and instructions for performing the techniques described above. This memory may also be used for storing temporary variables or other intermediate information during execution of instructions to be executed by processor 2401. Possible implementations of this memory may be, but are not limited to, random access memory (RAM), read only memory (ROM), or both. A storage device 2403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 2403 may include source code, binary code, or software files for performing the techniques or embodying the constructs above, for example.

Computer system 2410 may be coupled via bus 2405 to a display 2412, such as a cathode ray tube (CRT) or liquid crystal display (LCD), for displaying information to a computer user. An input device 2411 such as a keyboard and/or mouse is coupled to bus 2405 for communicating information and command selections from the user to processor 2401. The combination of these components allows the user to communicate with the system. In some systems, bus 2405 may be divided into multiple specialized buses.

Computer system 2410 also includes a network interface 2404 coupled with bus 2405. Network interface 2404 may provide two-way data communication between computer system 2410 and the local network 2420. The network interface 2404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 2404 sends and receives electrical, electromagnetic, or optical signals that carry digital data streams representing various types of information.

Computer system 2410 can send and receive information, including messages or other interface actions, through the network interface 2404 to an Intranet or the Internet 2430. In the Internet example, software components or services may reside on multiple different computer systems 2410 or servers 2431, 2432, 2433, 2434 and 2435 across the network. A server 2431 may transmit actions or messages from one component, through Internet 2430, local network 2420, and network interface 2404 to a component on computer system 2410.

The computer system and network 2400 may be configured in a client server manner. For example, the computer system 2410 may implement a server. The client 2415 may include components similar to those of the computer system 2410.

More specifically, the client 2415 may implement a client-side interface for displaying information generated by the server, for example via HTML or HTTP data exchanges. The computer system 2410 may implement the system 100 described above, for example by executing one or more computer programs. For example, the computer system 2410 may implement one of the application servers 114; the server 2431 may implement another application server 114; and the client 2415 may implement the client computer 112.

In summary, embodiments of the present invention implement systems and methods of proactive user assistance based on visible strings in UI components. The method enables users to get an easy short-cut-like access to the most relevant components of business applications based on the inferred user context on the desktop level. The context is determined through the visible text of various office applications on the user desktop and can change dynamically at any time. This will trigger also change in the suggestion of the relevant components so that the user will always have links to the most relevant business applications/application components at any time. Embodiments of the present invention work well when the business applications allow deep linking, i.e. direct shortcuts to internal UI screens/components. This condition is met in various business applications from the SAP portfolio, including EPM SBC as well as ABAP™ based systems.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer implemented method of presenting relevant application components to a user of a computer system, comprising:
   capturing, by the computer system, a plurality of text displayed in a plurality of applications, wherein the plurality of applications are open to the user, wherein the plurality of text displayed in the plurality of applications corresponds to a user context, wherein the user context corresponds to opened applications and documents, wherein the user context differs from an application component, wherein the application component corresponds to elements of an application;
   determining, by the computer system, a plurality of key terms in the plurality of text based on a key terms catalog;
   determining, by the computer system, a plurality of potentially relevant components by using the plurality of key terms to search a user interface dictionary, wherein the user interface dictionary corresponds to a map between user interface strings and user interface components;
   computing, by the computer system, a plurality of relevance scores for the plurality of potentially relevant components using the application component; and
   presenting, by the computer system to the user, a plurality of relevant components, wherein the plurality of relevant components correspond to relevant ones of the plurality of potentially relevant components according to the plurality of relevance scores.

2. The method of claim 1, further comprising:
   creating the user interface dictionary; and
   creating the key terms catalog based on the user interface dictionary.

3. The method of claim 2, wherein the computer system creates the user interface dictionary at design time of the plurality of applications.

4. The method of claim 2, wherein the computer system creates the user interface dictionary at runtime of the plurality of applications.

5. The method of claim 2, wherein the user interface is created manually according to an ontology modeling of the plurality of applications.

6. The method of claim 2, wherein the user interface is created manually according to an extensible markup language description file related to the plurality of applications.

7. The method of claim 2, wherein the computer system creates the key terms catalog by performing text analysis.

8. The method of claim 1, wherein the computer system captures the plurality of text by monitoring one of application events, mouse events and keyboard events.

9. The method of claim 1, wherein the computer system determines the plurality of key terms by performing text analysis on the plurality of text based on the key terms catalog.

10. The method of claim 1, wherein the computer system determines the plurality of potentially relevant components according to the user interface dictionary being keyed according to the plurality of key terms.

11. The method of claim 1, wherein the plurality of relevance scores are computed according to a number of occurrences of the plurality of key terms in the plurality of text having been captured.

12. The method of claim 1, wherein the plurality of relevance scores are computed according to a hierarchical user interface component structure.

13. The method of claim 1, wherein the plurality of relevance scores are computed according to a number of occurrences of the plurality of key terms in the plurality of text having been captured that are weighted according to a hierarchical user interface component structure.

14. The method of claim 1, wherein the plurality of relevant components correspond to a plurality of accessible relevant components, wherein the plurality of accessible relevant components are directly openable in the user interface environment.

15. The method of claim 1, wherein the plurality of relevant components correspond to a plurality of accessible relevant components, wherein the plurality of accessible relevant components are directly openable in the user interface environment according to a uniform resource location link.

16. A computer program, embodied on a non-transitory recording medium, for controlling a computer system to present relevant application components to a user of the computer system, the computer program comprising:
   a capturing component that is configured to control the computer system to capture a plurality of text displayed in a plurality of applications, wherein the plurality of applications are open to the user, wherein the plurality of text displayed in the plurality of applications corresponds to a user context, wherein the user context corresponds to opened applications and documents, wherein the user context differs from an application component, wherein the application component corresponds to elements of an application;

a first determining component that is configured to control the computer system to determine a plurality of key terms in the plurality of text based on a key terms catalog;

a second determining component that is configured to control the computer system to determine a plurality of potentially relevant components by using the plurality of key terms to search a user interface dictionary, wherein the user interface dictionary corresponds to a map between user interface strings and user interface components;

a computing component that is configured to control the computer system to compute a plurality of relevance scores for the plurality of potentially relevant components using the application component; and a presenting component that is configured to control the computer system to present to the user a plurality of relevant components, wherein the plurality of relevant components correspond to relevant ones of the plurality of potentially relevant components according to the plurality of relevance scores.

17. The computer program of claim 16, further comprising:

a generating component that is configured to control the computer system to create the user interface dictionary and to create the key terms catalog based on the user interface dictionary; and a storage component that is configured to control the computer system to store the key terms catalog and the user interface dictionary.

18. A computer system for presenting relevant application components to a user of the computer system, comprising:

a client computer; and an application server computer, including a processor and a memory, coupled to the client computer via a network, that is configured to capture a plurality of text displayed in a plurality of applications, wherein the plurality of applications are open to the user at the client computer, wherein the plurality of text displayed in the plurality of applications corresponds to a user context, wherein the user context corresponds to opened applications and documents, wherein the user context differs from an application component, wherein the application component corresponds to elements of an application, wherein the application server computer is configured to determine a plurality of key terms in the plurality of text based on a key terms catalog, wherein the application server computer is configured to determine a plurality of potentially relevant components by using the plurality of key terms to search a user interface dictionary, wherein the application server computer is configured to compute a plurality of relevance scores for the plurality of potentially relevant components using the application component, and wherein the client computer is configured to present to the user a plurality of relevant components, wherein the plurality of relevant components correspond to relevant ones of the plurality of potentially relevant components according to the plurality of relevance scores.

* * * * *